United States Patent
Clancy et al.

(10) Patent No.: US 9,500,122 B2
(45) Date of Patent: Nov. 22, 2016

(54) VARIABLE GEOMETRY NOZZLE AND ASSOCIATED METHOD OF OPERATION

(71) Applicant: General Electric Company, Schenectady, NY (US)

(72) Inventors: Cathal Clancy, Munich (DE); Daniel Edward Loringer, Erie, PA (US); Rodrigo Rodriguez Erdmenger, Munich (DE); Vittorio Michelassi, Munich (DE)

(73) Assignee: General Electric Company, Niskayuna, NY (US)

( * ) Notice: Subject to any disclaimer, the term of this patent is extended or adjusted under 35 U.S.C. 154(b) by 151 days.

(21) Appl. No.: 13/931,191

(22) Filed: Jun. 28, 2013

(65) Prior Publication Data

US 2015/0000268 A1      Jan. 1, 2015

(51) Int. Cl.
  *F02B 37/24*    (2006.01)
  *F02B 37/013*   (2006.01)
  *F02B 37/00*    (2006.01)
  *F01D 17/16*    (2006.01)
  *F01D 5/14*     (2006.01)

(52) U.S. Cl.
  CPC ............ *F02B 37/24* (2013.01); *F01D 17/162* (2013.01); *F01D 17/167* (2013.01); *F02B 37/004* (2013.01); *F02B 37/013* (2013.01); *F01D 5/146* (2013.01); *F05D 2220/40* (2013.01); *Y02T 10/144* (2013.01)

(58) Field of Classification Search
  CPC ................................ F01D 17/14; F02B 37/24
  USPC ........................................................ 415/194
  See application file for complete search history.

(56) References Cited

U.S. PATENT DOCUMENTS

| | | | |
|---|---|---|---|
| 2,292,384 A * | 8/1942 | Lysholm ................. | F16H 61/56 60/334 |
| 4,183,209 A * | 1/1980 | Kronogard ..................... | 415/161 |
| 5,372,485 A * | 12/1994 | Sumser et al. ................ | 415/166 |
| 5,984,631 A | 11/1999 | Tolgos | |
| 5,996,347 A | 12/1999 | Nagae et al. | |
| 6,318,668 B1 | 11/2001 | Ulanoski et al. | |
| 6,511,285 B2 | 1/2003 | Dodd | |
| 7,249,930 B2 | 7/2007 | Lombard et al. | |
| 7,490,470 B2 | 2/2009 | Jinnai et al. | |
| 7,553,126 B2 | 6/2009 | Charier et al. | |
| 7,735,320 B2 * | 6/2010 | Yanakiev ........................ | 60/612 |
| 8,007,229 B2 | 8/2011 | McCaffrey et al. | |
| 8,231,339 B2 | 7/2012 | Yoshinaga et al. | |
| 2010/0278628 A1 | 11/2010 | Ooyama | |
| 2013/0315718 A1 * | 11/2013 | Parker et al. ................. | 415/157 |

* cited by examiner

*Primary Examiner* — Mary A Davis
(74) *Attorney, Agent, or Firm* — John P. Darling

(57) ABSTRACT

The method includes moving at least one of a first support and a second support to vary a position of the plurality of main blades and tandem blades relative to each other to control one or more flow control characteristics across the turbine. The turbine includes a nozzle having the plurality of main blades and tandem blades. The plurality of main blades are coupled to the first support and the plurality of tandem blades are coupled to the second support disposed spaced apart from the first support.

14 Claims, 6 Drawing Sheets

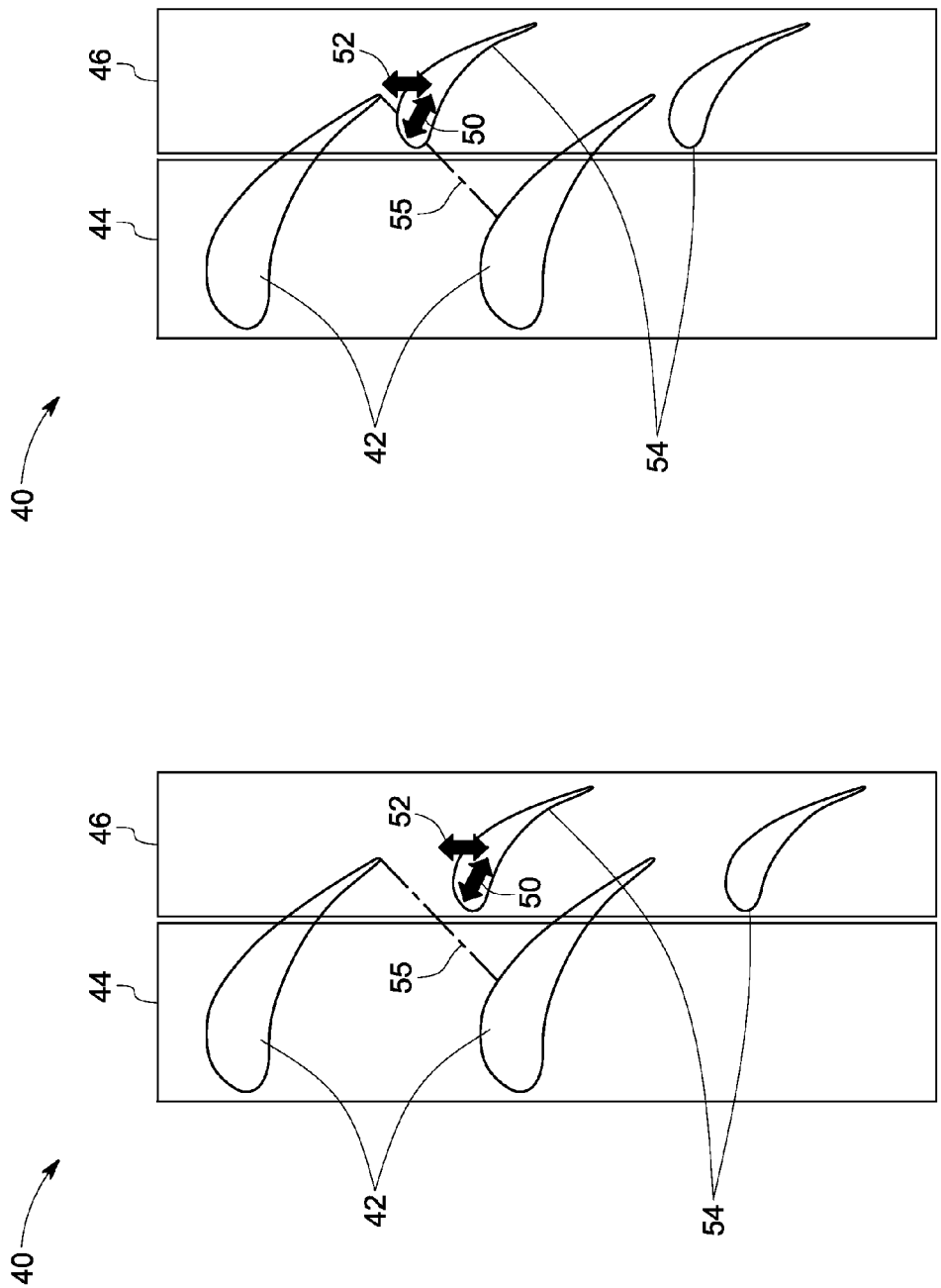

VARIABLE GEOMETRY NOZZLE AND ASSOCIATED METHOD OF OPERATION

BACKGROUND

The invention relates generally to nozzles, and more particularly to a variable geometry nozzle for turbines in a turbocharger, for example.

Fixed geometry turbochargers are normally designed for a specific operating condition of the internal combustion engine. Hence, such a turbocharger may be in an off-design condition across a wide range of engine operating points. Performance of a fixed geometry turbocharger may be reduced during part load operation and hence, may introduce challenges associated with meeting the air handling requirements for emissions and performance. Variable geometry turbochargers may be used to address problems associated with the fixed geometry turbochargers. The optimal turbine requirements for part load conditions are very different from the optimal requirements at full load. Variable geometry turbochargers (VGT) address such a limitation by allowing the effective size of the turbine nozzle to vary from part load to full load operating conditions.

The effective turbine size is determined primarily by a turbine nozzle throat area. A variable nozzle turbine alters the effective nozzle throat area and turning angle in order to effect a change in the turbine operating characteristics. The nozzle throat area is varied depending on an engine load. The variable nozzle turbine provides transient response benefits and specific fuel consumption benefits during both full load and partial load conditions. The variable nozzle turbine also allows customizing the air handling system for different operating conditions.

Conventional variable geometry turbochargers are implemented with rotatable/sliding nozzle guide vanes. In one conventional implementation, each nozzle airfoil is a separate piece that rotates about its own axis. Each nozzle airfoil requires a bushing/bearing/seal and requires a mechanically complex actuating mechanism. The large number of components, seals, and moving parts make the conventional VGT systems unattractive from the point of view of cost and reliability.

BRIEF DESCRIPTION

In accordance with one exemplary embodiment, a method is disclosed. The method includes moving at least one of a first support and a second support to vary a position of the plurality of main blades and tandem blades relative to each other to control one or more flow characteristics across the turbine. The turbine includes a nozzle having the plurality of main blades and tandem blades. The plurality of main blades are coupled to the first support and the plurality of tandem blades are coupled to the second support disposed spaced apart from the first support.

In accordance with another exemplary embodiment, a nozzle is disclosed. The nozzle includes a plurality of main blades coupled to a first support and a plurality of tandem blades coupled to a second support disposed spaced apart from the first support. At least one of the first support and the second support are movable to vary a position of the plurality of main blades and the tandem blades relative to each other.

In accordance with yet another exemplary embodiment, a system is disclosed. The system includes a machine having a nozzle. The nozzle includes a plurality of main blades coupled to a first support and a plurality of tandem blades coupled to a second support disposed spaced apart from the first support. At least one of the first support and the second support are movable to vary a position of the plurality of main blades and the tandem blades relative to each other.

DRAWINGS

These and other features, aspects, and advantages of the present invention will become better understood when the following detailed description is read with reference to the accompanying drawings in which like characters represent like parts throughout the drawings, wherein:

FIG. 6a is a an elevation view of a section of a plurality of main blades and tandem blades of a variable geometry nozzle in accordance with an embodiment of the present invention; and FIG. 6b is an elevation view of a section of a plurality of main blades and tandem blades of a variable geometry nozzle in accordance with an embodiment of the present invention.

DETAILED DESCRIPTION

In accordance with certain embodiments of the present invention, a variable geometry nozzle for a machine is disclosed. The variable geometry nozzle includes a plurality of main blades coupled to a first support, and a plurality of tandem blades coupled to a second support disposed spaced apart from the first support. At least one of the first support and the second support are movable to vary position of the plurality of main blades and the tandem blades relative to each other. Such a configuration reduces the number of parts compared to a conventional system, and reduces the reliability risks and costs associated with the system. In one embodiment, each of the first support and the second support has the same radius and are separated from each other by a relative axial gap. In accordance with a specific embodiment of the present invention, an engine having the exemplary variable geometry nozzle is disclosed. In accordance with another embodiment, a method for actuating the exemplary variable geometry nozzle is disclosed.

Figure 1:
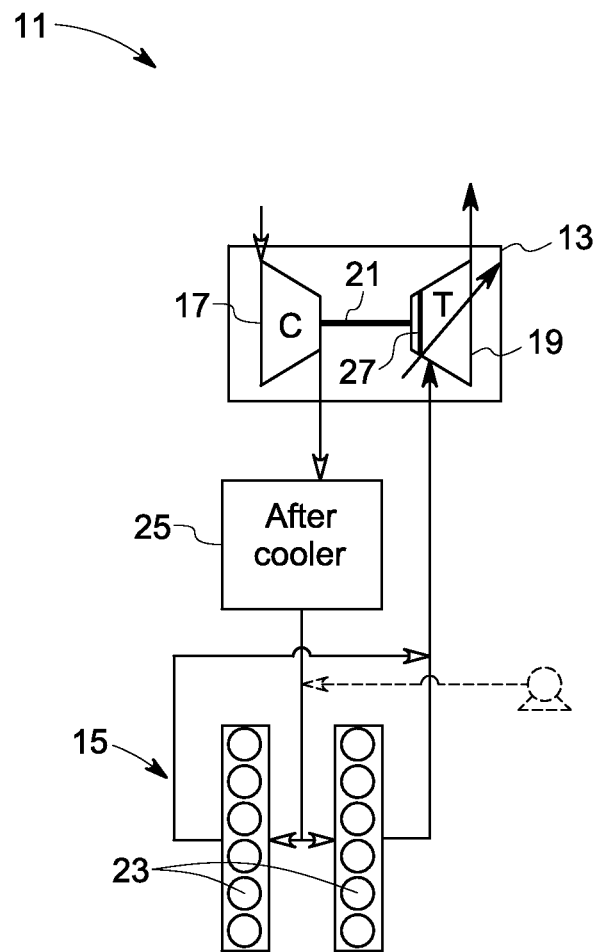
FIG. 1 is a schematic representation of a turbo charged engine system in accordance with an exemplary embodiment of the present invention.

Referring to FIG. 1, a schematic representation of an engine system 11 is illustrated in accordance with certain embodiments of the present invention. In the illustrated embodiment, the system 10 includes a turbocharger 13, and an internal combustion engine 15. The turbocharger 13 includes a compressor 17 coupled to a turbine 19 via a turbocharger shaft 21. It should be noted herein that configuration of the engine system 10 is an exemplary embodiment and should not be construed as a limitation of the invention.

The compressor 17 is operated to compress the air and feed the compressed air to a plurality of cylinders 23 of the engine 15 via an after-cooler 25. The compressed air flows through the after-cooler 34 such that the temperature of air is reduced prior to delivery into the plurality of cylinders 23.

The turbine 19 expands the exhaust gas from the engine 15 for extracting energy from the exhaust gas for rotating the turbocharger shaft 21 coupled to the compressor 17. The expanded gas from the turbine 19 is ejecting out through an exhaust stack. In the illustrated embodiment, at least a portion of the exhaust gas may be re-circulated into the cylinders 23 of the engine 15.

In the illustrated embodiment, the turbine 19 of the turbocharger 13 includes a variable geometry nozzle 27 for selectively controlling the flow of a combustion gas from the engine 15 through the turbine 19. It should be noted herein that although the exemplary variable geometry nozzle 27 is discussed herein with reference to a turbine, the variable geometry nozzle 27 may also be applicable to other components requiring control of flow of a gaseous medium.

Although an internal combustion engine 15 is disclosed herein, the variable geometry nozzle 27 is also applicable to other type of machines. In another specific embodiment, the exemplary variable geometry nozzle 27 may also be applicable to a gas turbine. Other applications may include but not limited to radial flow machines, axial flow machines, or the like. Engine applications may include but not limited to vehicle engines, stationary engines, or the like.

Figure 2:
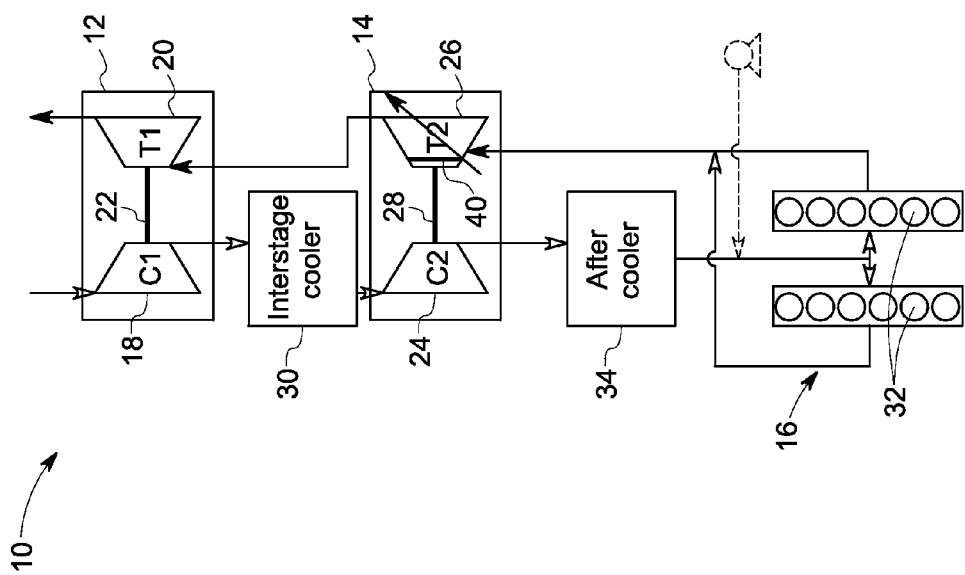
FIG. 2 is a schematic representation of a turbo charged engine system in accordance with another exemplary embodiment of the present invention.

Referring to FIG. 2, a schematic representation of an engine system 10 is illustrated in accordance with certain embodiments of the present invention. In the illustrated embodiment, the system 10 includes a low pressure turbocharger 12, a high pressure turbocharger 14, and an internal combustion engine 16. The low pressure turbocharger 12 includes a low-pressure compressor 18 coupled to a turbine 20 via a turbocharger shaft 22. The high pressure turbocharger 14 includes a high-pressure compressor 24 coupled to a turbine 26 via a turbocharger shaft 28. It should be noted herein that configuration of the engine system 10 is an exemplary embodiment and should not be construed as a limitation of the invention.

The low-pressure compressor 18 is operated to supply compressed air to the high-pressure compressor 24 via an inter-stage cooler 30. The temperature of air is increased due to compression in the low-pressure compressor 18. The compressed air flows through the inter-stage cooler 30 such that the temperature of air is reduced prior to delivery into the high-pressure compressor 24. The high-pressure compressor 24 is operated to further compress the air and feed the compressed air to a plurality of cylinders 32 of the engine 16 via an after-cooler 34. The compressed air flows through the after-cooler 34 such that the temperature of air is reduced prior to delivery into the plurality of cylinders 32.

The turbine 26 expands the exhaust gas from the engine 16 for extracting energy from the exhaust gas for rotating the turbocharger shaft 28 coupled to the high-pressure compressor 24. The expanded gas from the turbine 26 is further expanded in the turbine 20 before ejecting out through an exhaust stack. The turbine 20 expands the exhaust gas for extracting energy from the exhaust gas for rotating the turbocharger shaft 22 coupled to the low-pressure compressor 18. In certain embodiments, at least a portion of the exhaust gas may be re-circulated into the cylinders 32 of the engine 16.

In the illustrated embodiment, the turbine 26 of the high pressure turbocharger 14 includes a variable geometry nozzle 40 for selectively controlling the flow of a combustion gas from the engine 16 through the turbine 26. In some other embodiments, the variable geometry nozzle 40 may be disposed within, for example, the Low Pressure Turbocharger 12. It should be noted herein that although the exemplary variable geometry nozzle 40 is discussed herein with reference to a turbine, the variable geometry nozzle 40 may also be applicable to other components requiring control of flow of a gaseous medium.

Figure 3:
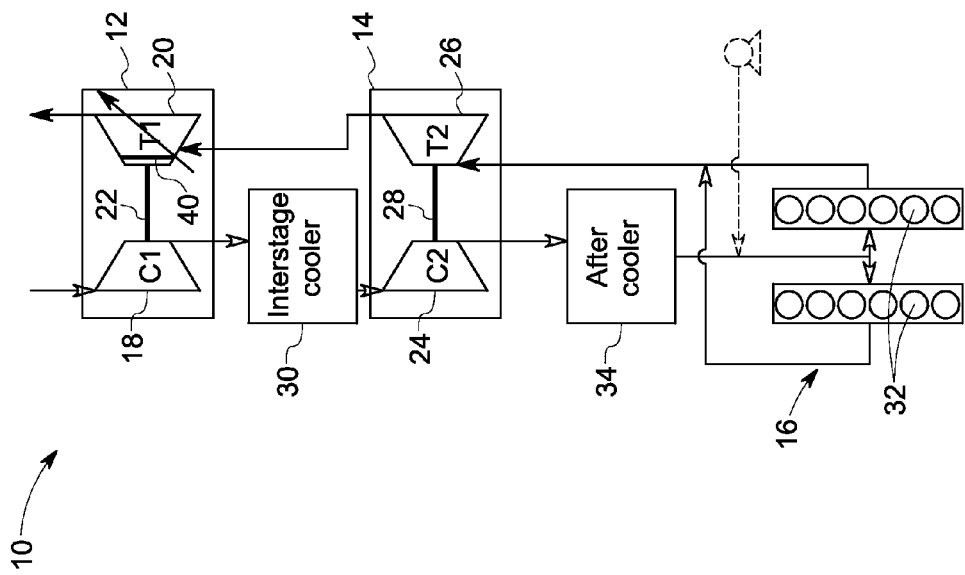
FIG. 3 is a schematic representation of a turbo charged engine system in accordance with another exemplary embodiment of the present invention.

Referring to FIG. 3, a schematic representation of the engine system 10 is illustrated in accordance with certain embodiments of the present invention. The illustrated engine system 10 is similar to the embodiment of FIG. 2, except that the turbine 20 of the low pressure turbocharger 12 includes the variable geometry nozzle 40 for selectively controlling the flow of a combustion gas from the turbine 26 through the turbine 20. Specifically, the variable geometry nozzle 40 is used to control one or more flow control characteristics such as power, a pressure ratio, a mass flow across the turbine.

Figure 4A:
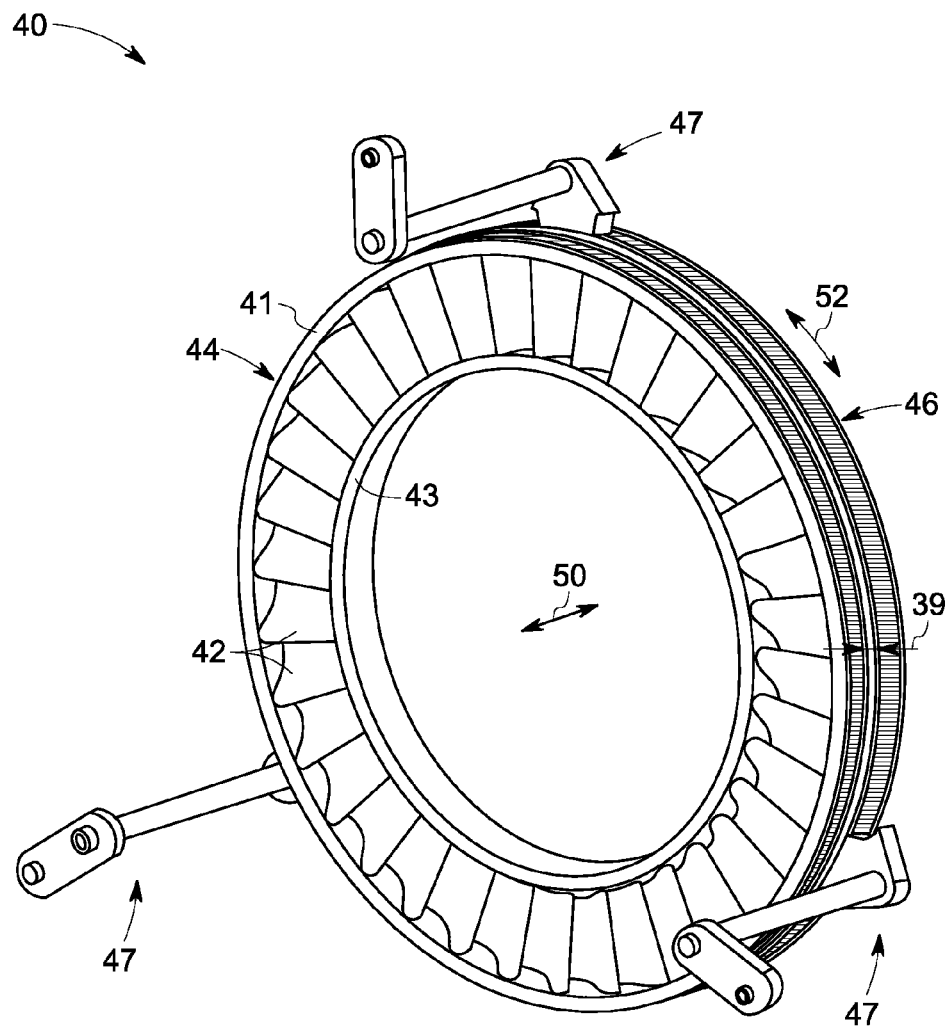
FIG. 4a is a is a front perspective view of a variable geometry nozzle located within a turbine in accordance with an embodiment of FIG. 2.

Referring to FIG. 4a, a front perspective view of the variable geometry nozzle 40 located within the turbine 26 (shown in FIG. 2), for example is illustrated. As discussed previously, the variable geometry nozzle 40 is used for selectively controlling the flow of the combustion gas from the engine through the turbine. The nozzle 40 includes a plurality of main blades 42 spaced apart and coupled to a first support 44 (e.g., outer diameter vane ring), and a plurality of tandem blades (not shown in FIG. 4a) spaced apart and coupled to a second support 46 (e.g., inner diameter vane ring). The first support 44 and the second support 46 may be defined about an engine axis such that each of the first support 44 and the second support 46 has the same radius and are separated from each other by a relative axial gap 39. In another embodiment, the first support 44 and the second support 46 are radially separated. In a specific embodiment, the second support 46 is disposed radially inward relative to the first support 44.

The plurality of main blades 42 and the tandem blades form a rigid structural assembly which accommodates thermal and aerodynamic loads during operation. In the illustrated embodiment, the variable geometry nozzle 40 constitutes one stage of blades (vanes) in the turbine. In the disclosed embodiment, each tandem blade alternates with each main blade 42. It should be understood, however, that any number of tandem blades may be interspersed with the plurality of main blades 42. In other words, in other non-limiting embodiments, two or more tandem blades may be interspersed between each main blade 42.

In the illustrated embodiment, a plurality of actuator links 47 are coupled to the second support 46. The plurality of actuator links 47 which are coupled to one or more actuators (not shown in FIG. 4a), are used to move the second support 46. In one embodiment, the first support 44 is stationary. In the illustrated embodiment, the first support 44 includes an outer section 41 and an inner section 43. Specifically, the plurality of main blades 42 are disposed between the outer section 41 and the inner section 43. In certain embodiments, the second support 46 is movable along the axial direction 50 relative to the first support 44. In certain embodiments, the second support 46 is movable along the circumferential direction 52 relative to the first support 44. In one embodiment, the actuator links 47 may include a unison ring, an actuator arm, and a spindle. Other types of actuators are also envisioned.

Figure 4B:
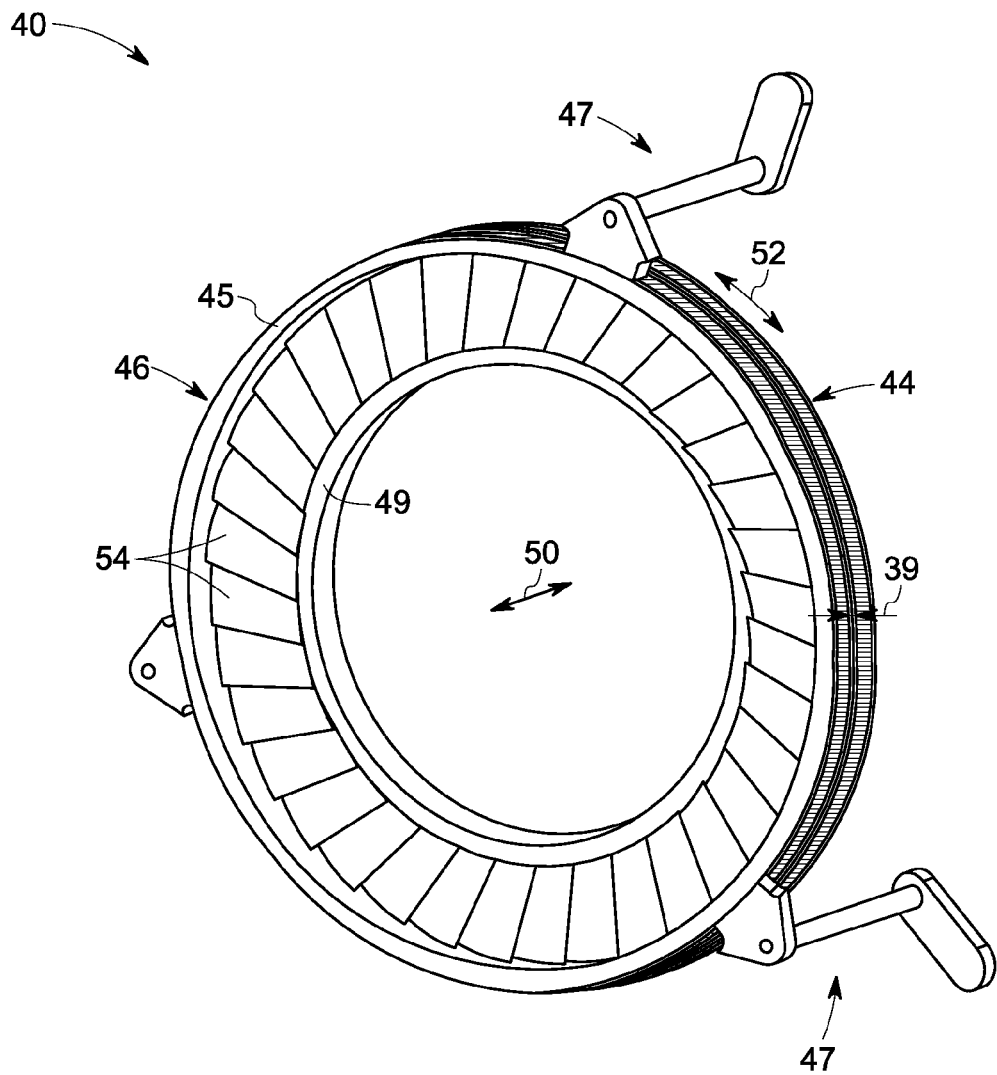
FIG. 4b is a rear perspective view of a variable geometry nozzle located within a turbine in accordance with an embodiment of the present invention.

Referring to FIG. 4b, a rear perspective view of the variable geometry nozzle 40 located within the turbine is illustrated. The illustrated embodiment has the plurality of main blades (not shown in FIG. 4b) spaced apart and coupled to the first support 44 and a plurality of tandem blades 54 spaced apart and coupled to the second support 46. The plurality of actuator links 47 are coupled to the second support 46. The actuator links 47 which are coupled to one or more actuators (not shown in FIG. 4b), are used to move the second support 46 along the axial direction 50 and/or circumferential direction 52 relative to the first support 44. In one embodiment, the first support 44 is stationary. In some other embodiments, both the first support 44 and the second support 46 are movable.

In the illustrated embodiment, the second support 46 includes an outer section 45 and an inner section 49. Specifically, the plurality of tandem blades 54 are disposed between the outer section 45 and the inner section 49. In the illustrated embodiment, the plurality of actuator links 47 are coupled to the outer section 45.

The position of the plurality of main blades and the tandem blades 54 relative to each other are varied depending on a load of the engine. In certain embodiments, the position of the main blades relative to the tandem blades 54 for a full-load condition is different from the position of the main blades relative to the tandem blades 54 for a partial-load condition.

The exemplary variable geometry nozzle 40 allows a degree of freedom to vary the positioning of the main blades and tandem blades 54 relative to one another. The position variability of the main blades and tandem blades 54 may be utilized to alter an effective compound throat area of the nozzle 40 and thereby the pressure ratio across the turbine. It should be noted herein that the effective compound throat area is referred to as a minimum flow area of the combined main and tandem blade nozzle configuration. The variation in pressure ratio across the turbine allows for more flexible operation of the engine. In other words, varying the position of the main blades and the tandem blades 54 relative to each other, facilitates to adapt the engine for both the full-load and part load operating conditions.

Figure 5:
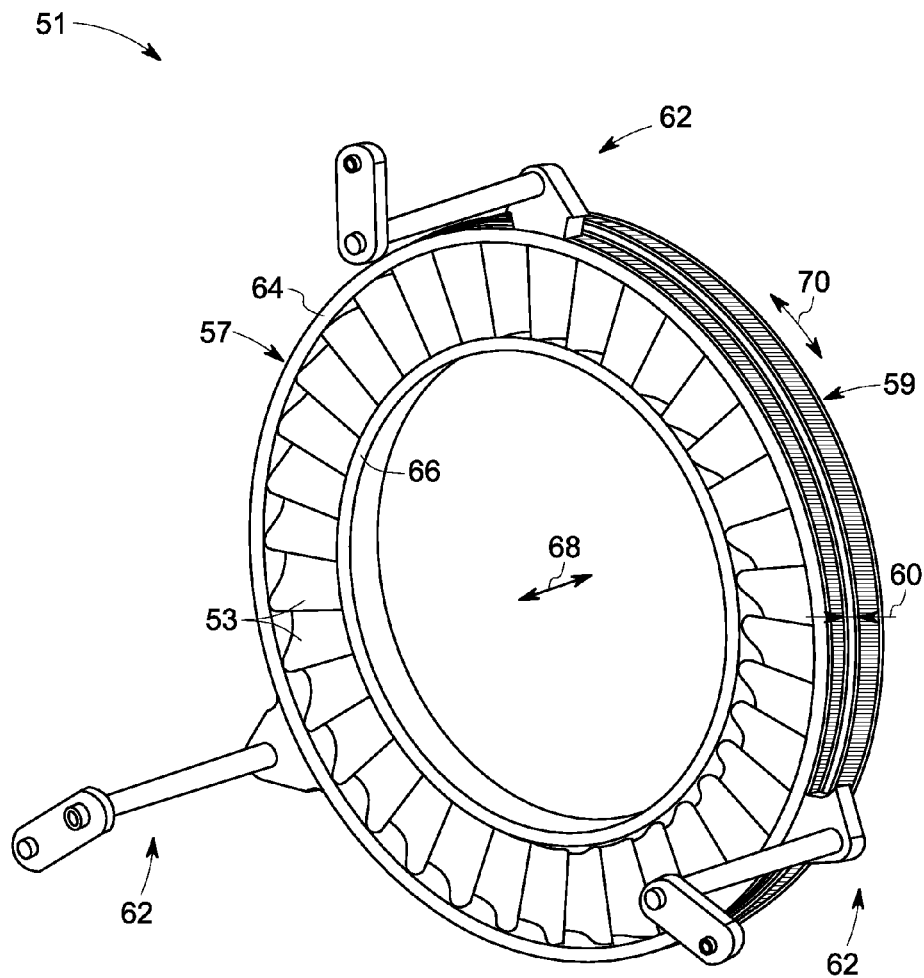
FIG. 5 is a is a front perspective view of a variable geometry nozzle in accordance with another exemplary embodiment.

Referring to FIG. 5, a front perspective view of a variable geometry nozzle 51 in accordance with another exemplary embodiment is illustrated. The nozzle 51 includes a plurality of main blades 53 spaced apart and coupled to a first support 57 and a plurality of tandem blades (not shown in FIG. 5) spaced apart and coupled to a second support 59. The first support 57 and the second support 59 may be defined about an engine axis such that each of the first support 57 and the second support 59 has the same radius and are separated from each other by a relative axial gap 60. In another embodiment, the first support 57 and the second support 59 are radially separated. In a specific embodiment, the second support 59 is disposed radially inward relative to the first support 57.

In the illustrated embodiment, a plurality of actuator links 62 are coupled to the first support 57. The plurality of actuator links 62 which are coupled one or more actuators (not shown in FIG. 5), are used to move the first support 57. In one embodiment, the second support 59 is stationary. In the illustrated embodiment, the first support 57 includes an outer section 64 and an inner section 66. Specifically, the plurality of main blades 53 are disposed between the outer section 64 and the inner section 66. In certain embodiments, the first support 57 is movable along an axial direction 68 relative to the second support 59. In certain other embodiments, the first support 57 is movable along a circumferential direction 70 relative to the second support 59.

Referring to FIGS. 6a and 6b, an elevation view of a section of the variable geometry nozzle 40 is shown in accordance with an embodiment of the present invention. FIG. 6a shows one position of the nozzle 40 and FIG. 6b shows another position of the nozzle 40. The nozzle 40 includes the plurality of main blades 42 coupled to the first support 44, and the plurality of tandem blades 54 coupled to the second support 46. In the illustrated embodiment, at least a portion of the plurality of main blades 42 are disposed overlapping at least a portion of the plurality of tandem blades 54.

In one embodiment, the actuator moves the first support 44 so as to vary position of the plurality of main blades 42 relative to the plurality of tandem blades 54 to selectively vary the effective compound throat area 55 of the nozzle 40. If the first support 44 is moved along the axial direction 50 relative to the second support 46, then the position of the main blades 42 are accordingly adjusted along the axial direction 50 relative to the tandem blades 54. Similarly, if the first support 44 is moved along the circumferential direction 52 relative to the second support 46, then the position of the main blades 42 are accordingly adjusted along the circumferential direction 52 relative to the tandem blades 54.

In another embodiment, the actuator moves the second support 46 via the actuator links so as to vary position of the plurality of tandem blades 54 relative to the plurality of main blades 42 to selectively vary an effective compound throat area 55 of the nozzle 40. If the second support 46 is moved along the axial direction 50 relative to the first support 44, then the position of the tandem blades 54 are accordingly adjusted along the axial direction 50 relative to the main blades 42. Similarly, if the second support 46 is moved along the circumferential direction 52 relative to the first support 44, then the position of the tandem blades 54 are accordingly adjusted along the circumferential direction 52 relative to the main blades 42. In a specific embodiment, the maximum movement of the blades 42, 54 along the circumferential direction 52 is about 10 degrees.

Variable geometry turbines, for example are typically used in turbocharged engine to address the power requirements during part-load operation of the engine. The use of variable geometry turbines avoids the need of using waste gates and improves the engine efficiency by reducing the pumping losses. However, variable geometry turbines have problems associated with large number of moving components prone to failure. In accordance with the embodiments of the present invention, the exemplary variable geometry nozzle changes the nozzle throat area of the turbine and also varies the nozzle turning angle to vary the power generated by the turbine. The exemplary variable geometry nozzle 40 has minimum moving parts and thereby reduced complexity, since the main blades 42 are coupled to one support and the tandem blades 54 are coupled to another support. Only the corresponding support is actuated to vary the position of the main blades 42 and/or the tandem blades 54.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A nozzle comprising:
 a plurality of main airfoil blades coupled to a first support;

a plurality of tandem airfoil blades coupled to a second support disposed spaced apart from the first support;
a first actuator link coupled to the first support; and
a second actuator link coupled to the second support, wherein the first support and the second support are moved by the first actuator link and the second actuator link along an axial direction relative to each other, wherein a portion of the plurality of main airfoil blades are disposed to overlap a portion of the plurality of tandem airfoil blades.

2. The nozzle of claim 1, wherein the first support and the second support are moved along a circumferential direction relative to each other.

3. A system comprising:
a machine having a nozzle comprising:
a plurality of main airfoil blades coupled to a first support
a plurality of tandem airfoil blades coupled to a second support disposed spaced apart from the first support;
a first actuator link coupled to the first support;
a second actuator fink coupled to the second support, wherein the first support and the second support are moved by the first actuator link and the second actuator link along an axial direction relative each other, wherein the machine comprises:
an engine,
a turbocharger coupled to the engine; wherein the turbocharger comprises a compressor coupled to a turbine; wherein the turbine includes the nozzle.

4. The system of claim 3, wherein the first support and the second support are moved along a circumferential direction relative to each other.

5. The system of claim 3, wherein a portion of the plurality of main airfoil blades are disposed to overlap a portion of the plurality of tandem airfoil blades.

6. The system of claim 3, wherein the turbocharger is a high pressure turbocharger.

7. The system of claim 3, wherein the turbocharger is a low pressure turbocharger.

8. A variable geometry nozzle, comprising:
a first support ring comprising a first inner section, a first outer section, and a plurality of first blades disposed circumferentially around the first support ring between the first inner section and the first outer section;
a second support ring axially spaced from the first support ring, the second support ring comprising a second inner section, a second outer section, and a plurality of second blades disposed circumferentially around the second support ring between the second inner section and the second outer section, wherein at least one second blade is interspersed between each pair of first blades;
a first actuator link connected to the first support ring;
a second actuator link connected to the second support ring, wherein the first and second actuator links move the first support ring and the second support ring circumferentially and axially relative to each other.

9. The variable geometry nozzle of claim 8, wherein the first blades are first airfoils and the second blades are second airfoils, and trailing edges of the first airfoils extend into the second support ring past leading edges of the second airfoils.

10. The variable geometry nozzle of claim 8, wherein the first support ring and the second support ring are movable circumferentially relative to each other up to 10°.

11. The variable geometry nozzle of claim 8, wherein the first support ring and the second support ring have equal diameters.

12. The variable geometry nozzle of claim 8, wherein the first inner section of the first support ring and the second inner section of the second support ring have equal diameters.

13. The variable geometry nozzle of claim 8, wherein the first outer section of the first support ring and the second outer section of the second support ring have equal diameters.

14. The variable geometry nozzle of claim 8, wherein the first inner section of the first support ring and the second inner section of the second support ring have equal diameters and the first outer section of the first support ring and the second outer section of the second support ring have equal diameters.

* * * * *